(12) United States Patent
Klipfel et al.

(10) Patent No.: US 10,086,450 B2
(45) Date of Patent: Oct. 2, 2018

(54) HAND-GUIDED STROKE-TYPE SAW HAVING AN UNTRUE-RUNNING CORRECTION DEVICE, AND METHOD FOR CORRECTION OF UNTRUE RUNNING

(71) Applicant: Robert Bosch GmbH, Stuttgart (DE)

(72) Inventors: Sebastian Klipfel, Weil am Rhein (DE); Marcel Fankhauser, Bern (CH)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 15/273,990

(22) Filed: Sep. 23, 2016

(65) Prior Publication Data

US 2017/0087649 A1 Mar. 30, 2017

(30) Foreign Application Priority Data

Sep. 24, 2015 (DE) ........................ 10 2015 218 339

(51) Int. Cl.
*B23D 51/10* (2006.01)
*B23D 49/16* (2006.01)

(52) U.S. Cl.
CPC .......... *B23D 51/10* (2013.01); *B23D 49/162* (2013.01); *B23D 49/167* (2013.01)

(58) Field of Classification Search
CPC ..... B23D 51/10; B23D 49/167; B23D 49/162
See application file for complete search history.

(56) References Cited

U.S. PATENT DOCUMENTS

| 2,580,930 | A | * | 1/1952 | Kost | B21D 28/34 |
| | | | | | 279/30 |
| 3,547,166 | A | | 12/1970 | Dudek et al. | |
| 3,795,980 | A | | 3/1974 | Batson | |
| 4,283,855 | A | | 8/1981 | Nalley | |
| 5,010,652 | A | | 4/1991 | Miletich | |
| 5,103,565 | A | * | 4/1992 | Holzer, Jr. | B23D 51/10 |
| | | | | | 279/76 |
| 5,267,498 | A | * | 12/1993 | Miyamoto | B23D 49/007 |
| | | | | | 279/22 |
| 5,322,302 | A | * | 6/1994 | Quirijnen | B23D 51/10 |
| | | | | | 279/22 |
| 5,351,590 | A | * | 10/1994 | Everts | B23D 51/14 |
| | | | | | 269/203 |
| D352,218 | S | * | 11/1994 | Nygards | B23D 51/14 |
| | | | | | D8/70 |
| 5,363,733 | A | * | 11/1994 | Baird | B23D 51/14 |
| | | | | | 403/DIG. 4 |

(Continued)

FOREIGN PATENT DOCUMENTS

DE 36 08 301 A1 9/1987
DE 10 2007 030 246 A1 1/2009
DE 10 2008 002 066 A1 12/2009

*Primary Examiner* — Sean Michalski
(74) *Attorney, Agent, or Firm* — Maginot, Moore & Beck LLP (57) ABSTRACT

A hand-guided stroke-type saw includes a stroke rod and a saw-blade receiver that is supported by the stroke rod. The stroke rod defines a stroke axis extending axially through the stroke rod. The saw-blade receiver is configured to receive a saw blade and defines a saw-blade receiver axis that extends axially through the saw-blade receiver and is substantially parallel to the stroke axis such that the saw-blade receiver is offset radially from the stroke axis in a first direction opposite to a direction of advance.

19 Claims, 5 Drawing Sheets

(56) References Cited

U.S. PATENT DOCUMENTS

| | | | | | |
|---|---|---|---|---|---|
| 5,443,276 A | * | 8/1995 | Nasser | | B23D 51/10 279/77 |
| 5,535,520 A | * | 7/1996 | Armstrong | | B23D 49/11 30/339 |
| 5,573,255 A | * | 11/1996 | Salpaka | | B23B 31/1071 279/75 |
| 5,634,277 A | * | 6/1997 | Wada | | B23D 51/02 279/76 |
| 5,647,133 A | * | 7/1997 | Dassoulas | | B23D 51/10 30/338 |
| 5,722,309 A | * | 3/1998 | Seyerle | | B23D 51/10 279/77 |
| 5,724,742 A | * | 3/1998 | Grabowski | | B23D 51/10 30/337 |
| 5,810,367 A | * | 9/1998 | Holzer, Jr. | | B23D 51/10 279/102 |
| 5,848,474 A | * | 12/1998 | Fortney | | B23D 51/10 279/97 |
| 5,903,983 A | * | 5/1999 | Jungmann | | B23D 51/10 279/75 |
| 5,987,758 A | * | 11/1999 | McCurry | | B23D 51/10 279/77 |
| 6,009,627 A | * | 1/2000 | Dassoulas | | B23D 51/10 279/79 |
| 6,023,848 A | * | 2/2000 | Dassoulas | | B23D 51/10 279/75 |
| 6,101,726 A | * | 8/2000 | Laverick | | B23D 51/10 279/30 |
| 6,105,482 A | * | 8/2000 | Garcia | | B23D 51/14 30/338 |
| 6,209,208 B1 | * | 4/2001 | Marinkovich | | B23D 51/10 271/81 |
| 6,233,833 B1 | * | 5/2001 | Grant | | B23D 51/10 279/75 |
| 6,295,736 B1 | * | 10/2001 | Dassoulas | | B23D 51/10 279/75 |
| 6,530,579 B1 | * | 3/2003 | Houben | | B23D 51/08 279/30 |
| 6,546,633 B1 | * | 4/2003 | Lovell | | B23D 51/10 30/334 |
| 6,662,698 B2 | * | 12/2003 | Wheeler | | B23D 51/10 83/698.71 |
| 6,694,624 B2 | * | 2/2004 | Stefanopulos | | B23D 51/10 30/337 |
| 6,848,186 B1 | * | 2/2005 | Chen | | B23D 51/10 279/76 |
| 6,944,959 B2 | * | 9/2005 | Bigden | | B23D 49/167 279/127 |
| 7,051,635 B2 | * | 5/2006 | Morehead | | B21D 28/34 279/76 |
| 7,325,315 B2 | * | 2/2008 | Bigden | | B23D 49/167 279/77 |
| 7,871,080 B2 | * | 1/2011 | Marini | | B23D 51/10 279/140 |
| 8,230,607 B2 | * | 7/2012 | Limberg | | B23B 31/1074 279/71 |
| 8,813,373 B2 | * | 8/2014 | Scott | | B23D 51/10 30/337 |
| 9,156,097 B2 | * | 10/2015 | Neitzell | | B23D 61/123 |
| 9,321,112 B2 | * | 4/2016 | Vantran | | B23D 51/10 |

* cited by examiner

HAND-GUIDED STROKE-TYPE SAW HAVING AN UNTRUE-RUNNING CORRECTION DEVICE, AND METHOD FOR CORRECTION OF UNTRUE RUNNING

This application claims priority under 35 U.S.C. § 119 to patent application no. DE 10 2015 218 339.4, filed on Sep. 24, 2015 in Germany, the disclosure of which is incorporated herein by reference in its entirety.

BACKGROUND

Hand-guided stroke-type saws, having an untrue-running correction device, and methods for correction of untrue running are already known.

DE 10 2008 002 066 A1 discloses a hand-guided stroke-type saw, having a stroke rod, a stroke axis extending substantially centrally through the stroke rod, a saw-blade receiver, disposed at least indirectly on the stroke rod, for receiving a saw blade, and a saw-blade receiver axis extending substantially centrally through the saw-blade receiver, at least substantially parallel to the stroke axis. In dependence on transverse forces, acting on the saw blade, that are picked up by sensor means and that result, for example, from untrue running of the saw blade, the saw blade is rotated by actuator means, by means of a transverse guidance, and is thus returned to its non-untrue initial state.

Similar is known from DE 10 2007 030 246 A1, wherein, disposed on a guide cheek of the saw blade, there is at least one force transducer that, in the case of transverse displacement of the saw blade, measures a transverse force and, for the purpose of compensating the transverse force, controls an actuator in such a manner that a transverse force opposed to the transverse displacement is applied to the saw blade.

SUMMARY

It is therefore the object of the present disclosure to provide a hand-guided stroke-type saw and method for correcting untrue running that, advantageously, does not have a sensor and actuator combination and that is robust, inexpensive, energy-saving, not susceptible to wear and simple.

The disclosure is based on a hand-guided stroke-type saw, having a stroke rod, a stroke axis extending substantially centrally through the stroke rod, a saw-blade receiver, disposed at least indirectly on the stroke rod, for receiving a saw blade, and a saw-blade receiver axis extending substantially centrally through the saw-blade receiver, at least substantially parallel to the stroke axis.

It is proposed that, as viewed in a direction of advance of the stroke-type saw, the saw-blade receiver axis be set back, in particular set back radially, with respect to the stroke axis. A hand-guided stroke-type saw is to be understood to mean, in particular, a portable hand-held power tool that can be transported by an operator without the use of a machine, in particular an electric, mains-power or battery operated, pneumatic or hydraulic hand-held power tool, which executes an oscillatory stroke motion and which is intended for performing sawing work on workpieces, such as, for example, a jigsaw, a saber saw or a pruning saw. A stroke rod is to be understood to mean equally a stroke cylinder or other stroke-rod profiles of a stroke-type saw that are known to those skilled in the art, for example having a cylindrical, angular or any other cross-sectional geometry. The saw blade is preferably exchangeably accommodated in the saw-blade receiver, in particular substantially locked against rotation when in the clamped-in state. The saw-blade receiver may be realized so as to be integral with at least the stroke rod. Advantageously, the saw-blade receiver is realized so as to be integral with at least a spacer, in the form of an offset means between the stroke rod and the saw-blade receiver, that produces the offset. As a result of the saw-blade receiver being disposed in a set-back manner, a saw-blade receiver axis extending centrally through the saw-blade receiver is disposed, as it were, "rearward" of the stroke axis. As viewed in a direction of advance of the stroke-type saw, therefore, the saw-blade receiver is disposed eccentrically in relation to the stroke rod, behind or set back from the stroke axis. In this context, set back is intended to define a region located on a side of an imaginary plane that faces away from the direction of advance, the plane extending at least substantially through the stroke axis and being perpendicular to a vector that defines the direction of advance. When the saw blade has been inserted in the saw-blade receiver, a saw-blade longitudinal axis that extends substantially centrally through the saw blade, in the direction of the longitudinal axis thereof, coincides with the saw-blade receiver axis. Owing to the set-back disposition of the saw-blade receiver, the proportion of the saw blade that is set back from the stroke axis of the stroke-type saw, or from the parting plane, is greater than the proportion of the saw blade that is in front of the stroke axis, or the parting plane, as viewed in the direction of advance of the stroke-type saw.

Advantageously, owing to the set-back disposition of the saw-blade receiver axis, untrue running can be corrected in that a transverse force, which acts on the saw-blade receiver as a result of the untrue running of the saw blade, displaces, or rotates, the saw-blade receiver that is disposed eccentrically in relation to the stroke rod, or stroke axis, about the stroke axis and thereby rotates the saw blade, clamped substantially fixedly in the saw-blade receiver, transversely in relation to the direction of advance. The rotation then acts in two ways. On the one hand, there is a relative change in alignment, with respect to the direction of advance, of the saw blade, clamped substantially fixedly in the saw-blade receiver, that corrects the direction of the saw blade. On the other hand, a counter transverse force is generated, which acts on a broadside of the rotated saw blade that faces toward the direction of advance, and compensates the transverse force resulting from the untrue running. The broadsides are to be understood to mean the sides of the saw blade that connect the cutting edge, having saw teeth, to the rearward saw-blade edge that is diametrically opposite the cutting edge.

Advantageously, a purely mechanical correction of untrue running can thereby be provided, without further sensors and/or actuators, and without what is sometimes an elaborate open-loop control or closed-loop control for the sensors and/or actuators. That, in turn, brings cost advantages and reduces the servicing requirement and fault susceptibility of the stroke-type saw as compared with untrue-running correction devices known from the prior art.

Variables, or quantities, to be varied for the purpose of setting a response behavior of the untrue-running correction may be, for example, at least, the torsional flexibility of the stroke rod, or of the saw-blade receiver fastened, at least indirectly, to the stroke rod, and/or the offset and/or the quality of the saw blade used, with its geometric and material properties. The torsional flexibility may be influenced and/or set, for example, by a stroke rod realized as a torsion rod, and/or an offset means that is torsionally flexible about the stroke axis, and/or saw-blade receiver that is torsionally flexible about the stroke axis.

In a further embodiment, it is proposed that the saw-blade receiver be realized so as to be rotatable about the stroke axis. A capability of the saw-blade receiver to rotate about the stroke axis may be realized on the stroke-type saw, for example, at least, by a saw-blade receiver accommodated, preferably rotatably mounted, on the stroke rod, and/or by a rotatable stroke rod held in a stroke-rod receiver of the stroke-type saw, and/or a stroke-rod receiver accommodated so as to be rotatable about the stroke axis, for example supported by means of appropriate axial and radial bearings. The provision of an elastic disposition of the aforementioned stroke-type saw elements about the stroke axis, for example as a torsionable stroke rod, a saw-blade receiver accommodated elastically about the stroke axis and the like, are also to be understood as a rotatable saw-blade receiver. This makes it possible, advantageously, to improve the untrue-running correction behavior, to increase a cutting precision, and to reduce a potential tendency of the untrue saw blade to bind in the workpiece.

Furthermore, it is proposed that the saw-blade receiver axis be set back by an amount $h_x$ with respect to the stroke axis, the amount $h_x$ being settable, preferably in a variable manner, in particular in dependence on the extent of the saw blade as viewed in the direction of advance, preferably in a variable manner, preferably being settable in such a manner that a cutting edge of the saw blade that has the saw teeth is set back from the stroke axis, at least as viewed in the direction of advance. The extent of the saw blade as viewed in the direction of advance is to be understood to mean a saw-blade width that extends from the cutting edge, sawing in the direction of advance, to the rearward saw-blade edge disposed diametrically opposite it. The amount $h_x$ is typically between >0 and the maximum width of a saw blade that can be inserted in the respective stroke-type saw. The cutting edge, substantially parallel to the stroke axis, of a saw blade that can be inserted in the stroke-type saw is thus set back from the stroke axis, as viewed in the direction of advance. Advantageously, this enables a response behavior of the untrue-running correction to be set to a specific application and/or to the respective saw blade, preferably varying according to the application, that is inserted in the stroke-type saw. That improves the quality of cut and reduces the offcut, or reject waste, produced as a result of the potential untrue running. Moreover, this enables the untrue-running correction to be switched on or off in a variable manner, and/or the degree thereof to be set in a variable manner.

Furthermore, it is proposed that the saw-blade receiver and/or the stroke rod and/or a stroke-rod guide of the hand-guided stroke-type saw be realized so as to be displaceable, in particular displaceable in a settable manner, at least transversely and/or along the direction of advance of the hand-guided stroke-type saw. Displaceable is to be understood also to mean displaceable in a swivelable manner. It is preferred in this case that the saw-blade receiver, or the end of the stroke rod that accommodates the saw-blade receiver, at least indirectly, and/or the stroke-rod receiver and/or the stroke mechanism be is realized so as to be swivelable about a fixed point on the stroke axis. A maximum swing of the swivel motion is effected, in particular, in the region of the saw-blade receiver. On the other hand, a preferred upper end of the stroke rod, or at least the end of the stroke rod that faces away from the saw-blade receiver, serves as a pivot axis base, and consequently is preferably realized as a fixed point located on the stroke axis. Preferably, the displacement capability is realized in an elastic, in particular resilient and/or damped, manner by appropriate means, for example by means of springs and/or dampers. The displacement capability enables the untrue-running correction behavior to be altered, preferably passively or actively, in a settable manner.

Furthermore, it is proposed that a first and at least one further constraint means be provided, to delimit, in particular to delimit in a settable manner, a rotation capability and/or displacement capability of the saw-blade receiver and/or of the stroke rod and/or of a stroke-rod guide. For this purpose, the first constraint means can be brought into contact with the at least one further constraint means, such that a constraining force is transmitted via the two constraining means. The expression "constraining force" is intended here to define, in particular, a force that is intended to prevent a body from moving in at least one direction and/or, in the case of a movement, to hold the body on a path that is defined by means of an action of the force on the body. Preferably, the first constraint means is connected, at least in a rotationally fixed manner, to the saw-blade receiver and/or the stroke rod and/or the stroke-rod guide, for example by means of a joint, jointed arm with a ball head, as a toothed wheel or the like. The at least one further constraint means is preferably realized as a stop means for the first constraint means. It is advantageously connected, at least in a rotationally fixed manner, to the machine housing of the stroke-type saw. It delimits the rotational play of the first constraint means, preferably in both directions of rotation, and is realized, for example, as a V-shaped groove, as a counter toothed wheel, as a hinge, as a joint head receiver and the like. Advantageously, it is designed to limit a displacement travel and/or rotation angle of the first constraint means and, in particular, is realized so as to be settable, such that, for example, the displacement travel and/or rotation angle of the first constraint means, or of the components fixedly connected thereto, can be defined in a settable manner. A rotation angle, preferably delimited by the constraint means, of the saw-blade receiver, stroke rod and/or stroke-rod receiver about the stroke axis is ±10°, preferably ±5°, in particular ±2°.

Furthermore, it is proposed that at least one third constraint means be provided, in order to vary the displacement capability and/or rotation capability of the saw-blade receiver and/or of the stroke rod and/or of the stroke-rod receiver in dependence on an advance-motion force acting at least on the saw-blade receiver, and/or in dependence on at least one axial position of the saw-blade receiver on its saw-blade receiver axis, in particular between a bottom and a top dead center of a stroke motion of the jigsaw. This may be, for example, spring elements or damping elements, which enable a displacement capability and/or rotation capability, for example in dependence on an advance speed of the stroke-type saw and/or of an advance-motion force.

In a further alternative embodiment, it is proposed that the first and the at least one further constraint means be provided, in order to convert a displacement caused substantially transversely in relation to the direction of advance, in particular a displacement, caused by untrue running of the saw blade, preferably of saw-blade receiver and/or stroke rod and/or stroke-rod receiver that, in this case, is displaceable transversely in relation to the direction of advance, into a rotary motion of the saw blade and/or of the saw-blade receiver and/or of the stroke rod and/or of the stroke-rod receiver, the rotary motion counteracting the displacement, in particular by reversal of the direction of rotation, and preferably returning the saw blade back to its initial position.

Advantageously, it is thereby possible to achieve correction of untrue running, preferably without a saw-blade receiver axis set back with respect to the stroke axis or, in combination with a set-back disposition of the saw-blade receiver, the untrue-running correction behavior can be improved.

Furthermore, it is proposed that the first constraint means be connected in a rotationally fixed manner to the saw-blade receiver and/or the stroke rod and/or the stroke-rod receiver, and have a connection to the further constraint means of the stroke-type saw, realized as a constraint-means receiver that is solid with the housing. The further constraint means in this case is advantageously accommodated in the constraint-means receiver so as to be at least partially movable, in particular having play.

Additionally proposed is a method for correction of untrue running of a saw blade, inserted in a stroke-type saw, in a workpiece, the stroke-type saw having at least one stroke rod having a stroke axis extending substantially centrally through the stroke rod, and a saw-blade receiver having a saw-blade receiver axis extending substantially centrally through the saw-blade receiver and the saw blade, at least substantially parallel to the stroke axis. The saw blade is accommodated in a substantially rotationally fixed manner in the saw-blade receiver, the saw-blade receiver axis having a set-back offset in relation to the stroke axis as viewed in the direction of advance. At least the saw-blade receiver is fastened, at least indirectly, so as to be rotatable about the stroke axis on the stroke rod. Owing to the set-back disposition of the saw blade, or of the saw-blade receiver axis, untrue running of the saw blade causes the saw blade, or the saw-blade receiver, to rotate about the stroke axis, as a result of which the saw blade disposed on the saw-blade receiver is returned to a reference or initial position. Untrue running of the saw blade is thereby counteracted in a corrective manner. The proposed method makes it possible to dispense with elaborate sensing and evaluation of the untrue running, and with open-loop or closed-loop control of sensors and actuators for correction of untrue running. The complexity and susceptibility in the attainment of untrue-running correction are thus reduced. Moreover, the proposed method makes it possible to reduce costs, energy provided for the stroke-type saw, and the wear on the stroke-type saw and the saw blade.

Furthermore, it is proposed that the saw-blade receiver, with the saw blade disposed in a substantially rotationally fixed manner thereon, is rotated about the stroke axis by a transverse force resulting from the untrue running of the saw blade and, consequently, owing to the saw blade being aligned transversely in relation to the direction of advance, there results a reversal of direction and/or a counter transverse force, out of the advance motion, acting on the lateral face of the rotated saw blade, that counteracts the untrue running and brings the saw blade disposed on the saw-blade receiver back into an initial position. This makes it possible, advantageously, for a purely mechanical, automatic untrue-running correction to be applied, matched to the respective case of untrue running, or to the degree of untrue running.

Furthermore, it is proposed that, in the case of the saw blade running untrue to the left, as viewed in the direction of advance, the rotation be effected clockwise about the stroke axis directed toward a base plate, and, in the case of the saw blade running untrue to the right, as viewed in the direction of advance, the rotation be effected counter-clockwise about the stroke axis directed toward a base plate, in particular the foot plate of the stroke-type saw. Advantageously, this enables the saw blade to be returned automatically to its initial position.

BRIEF DESCRIPTION OF THE DRAWINGS

Further advantages are disclosed by the following description of the drawings. The drawings show a plurality of exemplary embodiments of the disclosure. Those skilled in the art will expediently also consider the features individually and combine them to form appropriate further combinations.

DETAILED DESCRIPTION

Figure 1:
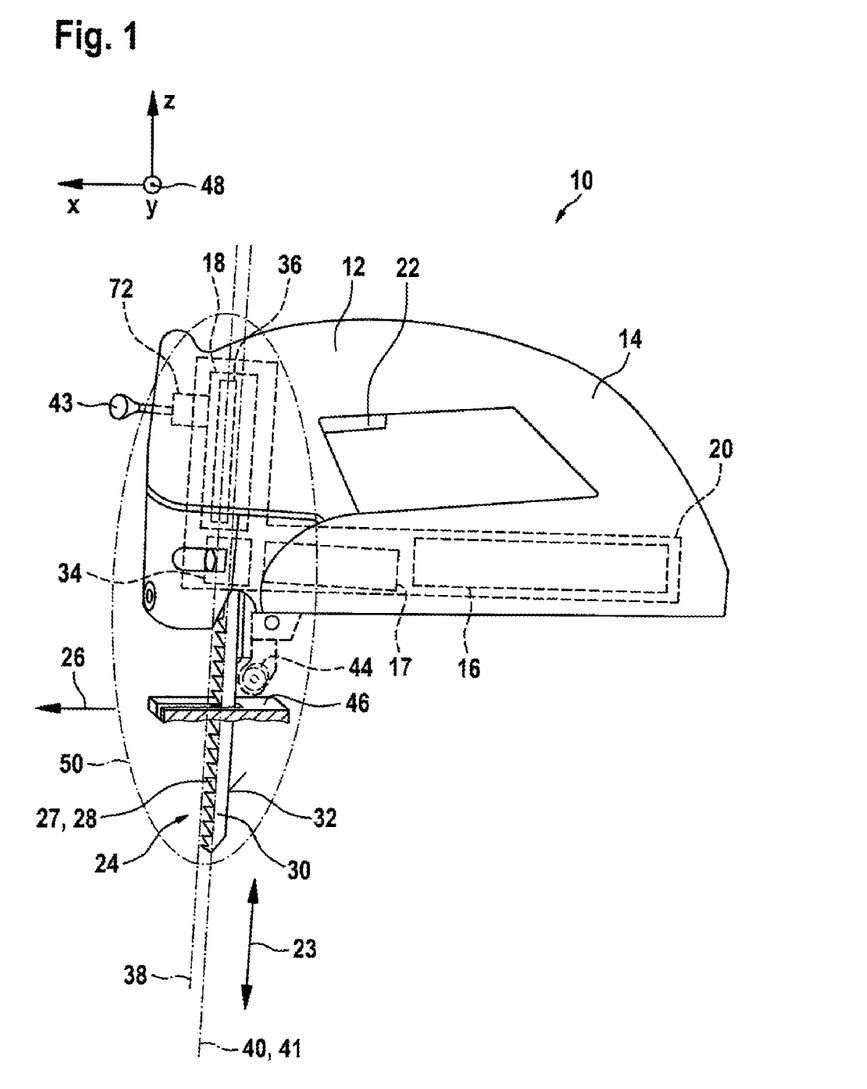
FIG. 1 a hand-guided stroke-type saw according to the disclosure, in the form of a jigsaw, in a schematic representation, FIG. 2a a detail from FIG. 1, which shows a stroke mechanism, according to the disclosure, of the stroke-type saw, having a saw blade arranged on a saw-blade receiver, FIG. 2b the stroke mechanism with saw blade according to FIG. 2a, in a simplified top view, in a non-untrue initial state, FIG. 2c the stroke mechanism with saw blade according to FIG. 2a, in a simplified top view, in a state with untrue running, FIG. 3 an alternative embodiment of the stroke mechanism, in a perspective view, FIG. 4a a simplified sectional representation B-B of the stroke mechanism according to FIG. 3, in a schematic top view, in a constrained position, FIG. 4b a simplified sectional representation B-B according to FIG. 3, in a schematic top view, in an arrangement subject to play, FIG. 4c an exemplary embodiment of a constraint means according to the disclosure, in a schematic view, FIG. 5a a displaceable stroke mechanism, in an initial position, and FIG. 5b the displaceable stroke mechanism according to FIG. 5a, in a position displaced transversely in relation to the direction of advance.

FIG. 1 shows a stroke-type saw according to the disclosure, realized as a jigsaw 10, in a schematic view. The jigsaw 10 is realized, exemplarily, as a bow-type handle jigsaw, but may also have alternative shapes such as, for example, that of an inline jigsaw, or be realized as a pruning saw, saber saw or other type of stroke-type saw. The jigsaw 10 has a housing 14, which comprises a handle 12 and accommodates a motor 16, a transmission 17 and a stroke mechanism 18. The motor 16 is realized as a battery-fed or mains-fed electric drive motor. However, the drive of the stroke-type saw may also be pneumatic, hydraulic, piezoelectric or similar.

The motor 16 is connected to the stroke mechanism 18 via the transmission 17. The motor 16, the transmission 17 and the stroke mechanism 18 constitute a drive train 20 of the jigsaw 10. The drive train 20 may also include further elements such as, for example, clutches, dampers, unbalance compensation elements or the like. The jigsaw 10 is put into operation by means of a switch 22, which is arranged in the region of the handle 12 and which activates, deactivates or controls the motor 16 by open-loop or closed-loop control, for example by means of open-loop or closed-loop control electronics, not represented. The rotating rotary motion of the motor 16 is converted, in a known manner, into an oscillatory motion, or stroke motion, of a saw blade 24 that is driven, at least indirectly, by the stroke mechanism 18. The saw blade 24 has a multiplicity of saw teeth 28 on a cutting edge 27 that faces in a direction of advance 26 of the jigsaw 10. In addition, the saw blade 24 has broadsides 30, and a rearward, non-sawing edge 32 that is diametrically opposite the cutting edge 27. There is a centrally defined saw-blade longitudinal axis 41, extending through the saw blade in the longitudinal direction. The saw blade 24 is exchangeably connected to the stroke mechanism 18 in a known manner by a tool receiver that is realized as a saw-blade receiver 34. The saw blade 24 is driven in an oscillating manner by the stroke mechanism 18, which comprises at least one stroke rod 36 and the saw-blade receiver 34. A stroke axis 38 extends at least substantially centrally through the stroke rod 36. A saw-blade receiver axis 40, which extends centrally through the saw-blade receiver 34, extends parallel to and offset from the stroke axis 38. The saw-blade receiver axis 40 is set back from the stroke axis 38, as viewed in the direction of advance 26. The saw-blade longitudinal axis 41 of the saw blade 24 coincides with the saw-blade receiver axis 40. In the direction of advance, therefore, the saw blade 24 is accommodated in the saw-blade receiver 34 such that it is set back, or rearward, from the stroke rod 36. At least one constraint means 74, which can optionally be set by means of a setting lever 43, is additionally arranged on the stroke mechanism 18. The constraint means 74 delimits, preferably in a settable manner, for example a rotation capability or misalignment capability of the stroke rod 36, as shown and explained in greater detail in FIGS. 3 to 5 and the associated description of the figures.

Also optionally arranged on the jigsaw 10 are further elements known to those skilled in the art, such as, for example, a reciprocating roller 44, which transmits a preferably settable reciprocating motion to the saw blade 24 and/or to the stroke mechanism 18, at least indirectly, and which is realized so as to be rotatable about the stroke axis 38, preferably at least in synchronism with the saw-blade receiver 34 and/or stroke rod 36, and a base plate 46, realized as a tool support surface. To simplify orientation, FIG. 1 additionally shows a coordinate system 48, the x-axis extending in the direction of advance 26, and the z-axis extending in the vertical axis direction 38. In an initial or basic state, therefore, the saw blade 24 inserted in the stroke-type saw can be defined as follows: the longitudinal direction of the saw blade, or of the saw-blade longitudinal axis 41, extends substantially in the z-axis direction, a width extent that is defined by an orthogonal connecting line of the front and rear cutting edge 27, 32 of the saw blade 24 extends in the x-axis direction, and the depth extent, or thickness, of the saw blade 24 extends in the y-axis direction. The direction of advance 26 is defined in a positive x-axis direction.

Figure 2A:
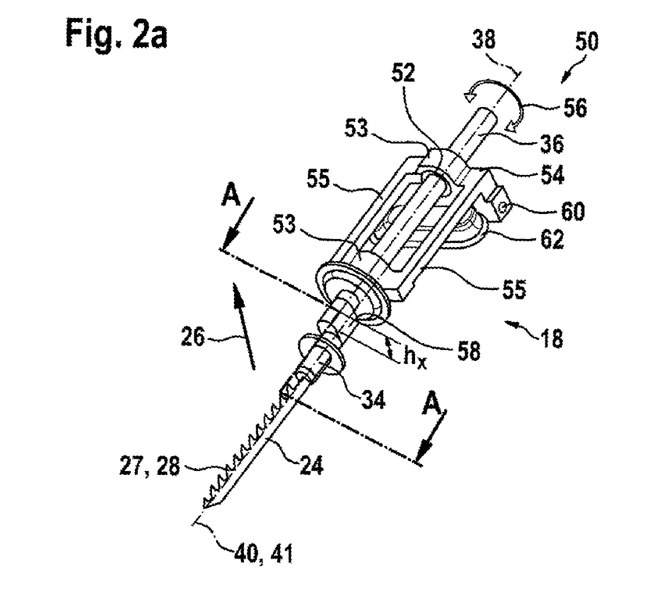

FIG. 2a shows the stroke mechanism 18, with a saw blade 24 arranged thereon. The stroke mechanism 18 comprises the stroke rod 36, which is realized as a hollow tube or as a round rod and which, by means of two radial and axial bearings 52, is accommodated in a rotatable and axially displaceable manner in a stroke-rod receiver 54. Also conceivable is any other number of radial and/or axial bearings 52; moreover, a different type of arrangement thereof on the stroke mechanism 18 and/or on the jigsaw 10 may be selected. Furthermore, the stroke rod 36 may also have any other cross-sectional profile, or it may be omitted entirely and be replaced by a drive, preferably a shape-change drive such as, for example, a piezoelectric drive, that drives the saw blade 24, at least indirectly, in the stroke direction. In addition to the stroke motion 23, the stroke rod 36 may execute a rotary motion about the stroke axis 38, in a direction of rotation 56. The saw-blade receiver 34 is set back from the stroke axis 38 by an amount $h_x$, by means of an offset means 58 realized as a spacer. When the saw blade 24 has been fixed in the saw-blade receiver 40, the saw-blade longitudinal axis 41 coincides with the saw-blade receiver axis 40. In principle, however, the saw blade 24 may also be arranged eccentrically on the saw-blade receiver 34, such that the saw-blade longitudinal axis 41 does not coincide with the saw-blade receiver axis 40. In the case of such an arrangement, it is nevertheless necessary for the saw blade 24 to be accommodated rearward of the stroke axis 38, as viewed in the direction of advance 26. Consequently, as viewed in the direction of advance 26, at least the saw-blade longitudinal axis 41 must be arranged such that it is set back from the stroke axis 38. In both cases, it is advantageous if the amount of this offset is selected in such a manner that the cutting edge 27 of the saw blade 24 is set back from the stroke axis 38, as viewed in the direction of advance 26. The offset between the stroke axis 36 and the saw-blade receiver 34 is represented as an amount $h_x$. The magnitude of the amount $h_x$ affects the response behavior of the untrue-running correction.

The offset means 58 may be realized so as to be integral with the stroke rod 36 and/or the saw-blade receiver 34, or realized as a separate spacer. In the present case, the saw-blade receiver 34 is realized so as to be integral with the offset means 58, which is connected to the stroke rod 36 in a rotationally fixed manner. However, the offset means 58 may also be rotatably connected to the stroke rod 36, for example by radial and/or axial bearings. In this case, advantageously, the entire stroke rod 36 need not be realized so as to be rotatable about the stroke axis 38, but only the saw-blade receiver 34.

The saw-blade receiver 34 is arranged eccentrically on the stroke rod 36, or at least eccentrically in relation to the stroke axis 38. Rotation of the stroke rod 36 in the direction of rotation 56, about the stroke axis 38, consequently likewise results in the saw-blade receiver 34, and the saw blade 24 clamped therein, being rotated about the stroke axis 38. Likewise, a displacement of the saw blade 24 transversely in relation to the direction of advance 26 necessarily results in a rotation of the saw blade 24, and of the saw-blade receiver 34, about the stroke axis 38, in particular in a change of orientation of the broadsides 30 of the saw blade 24 relative to the direction of advance 26.

The stroke-rod receiver 54 is realized as a double bearing bridge 53, having two forks 55 that are substantially parallel to the stroke axis 38, and two axial or radial bearings 52 that are held in the bearing bridges 53 and centrally support the stroke rod 36. The effect of correcting untrue running can already be ensured by the stroke rod 36 being eccentrically and rotatably supported in the stroke-rod receiver 54, provided that the stroke rod 36 is arranged such that it is set back from the stroke-rod receiver 54 in the counter direction of advance 26. Provided on the stroke-rod receiver 54 there are drilled receiving holes 60 for fastening means, for connecting the stroke-rod receiver 54 to the jigsaw 10, or to the housing 14, preferably with reciprocating capability. Additionally represented is a driving-force transmission means 62 that, driven by the transmission 17, being driven in an oscillatory manner, generates a stroke motion of the stroke rod 36, in a manner known to those skilled in the art. The mechanism, arranged on the saw-blade receiver 34, for fixing the saw blade 24 in the saw-blade receiver 34 is not described in greater detail, as it is assumed to constitute professional knowledge of those skilled in the art. Reference may be made, for example, to the SDS technology for Bosch jigsaws. The same also applies to alternative saw-blade receivers of other stroke-type saws, in which, advantageously, the saw blade 30 is accommodated so as to be movable at least radially about the saw-blade receiver axis 40 and axially fixed, at least substantially. However, a certain degree of freedom of the saw blade 24 in the direction of advance 26, particularly to a slight extent, may be appropriate and possible in order to avoid the tendency to bind, or for other reasons, at least in many cases.

Figure 2B:
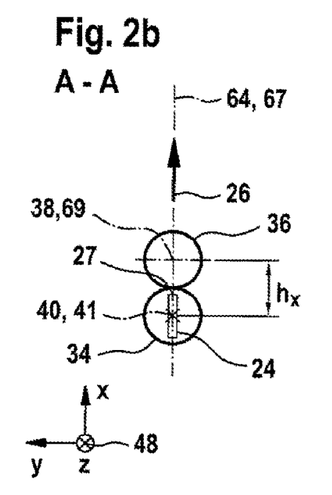

FIG. 2b shows a section A-A through the stroke rod 36 and the saw blade 24 from FIG. 2a, in a simplified top view. As viewed in the direction of advance 26, the saw-blade receiver axis 40 that extends centrally through the saw blade 24 is set back, by the amount $h_x$, from the stroke axis 38 that extends centrally through the stroke rod 36. In the exemplary embodiment represented, as viewed in the direction of advance 26, the cutting edge 27 of the saw blade 24 is also set back from the stroke axis 38. It is also possible, however, for the cutting edge 27, as viewed in the direction of advance 26, to be disposed on the stroke axis 38, or even in front of the stroke axis 38 as viewed in the direction of advance 26. In this case, however, it must be ensured that the saw-blade longitudinal axis 41 is set back at least from the stroke axis 38.

The saw blade 24 is in a non-untrue state, as it were, in a reference state or initial state. In this case, the saw-blade receiver axis 40 intersects perpendicularly, at least substantially, a direction of advance axis 64 constituted by the direction of advance 26. Extending centrally between the broadsides 30 of the saw blade 24, orthogonally in relation to the cutting edge 27 and the rear edge 32, there is a broadside axis 67 of the saw blade 24. As shown by FIG. 2b, this axis is oriented parallel to the direction of advance axis 64 and parallel to the x-axis of the coordinate system 48.

Figure 2C:
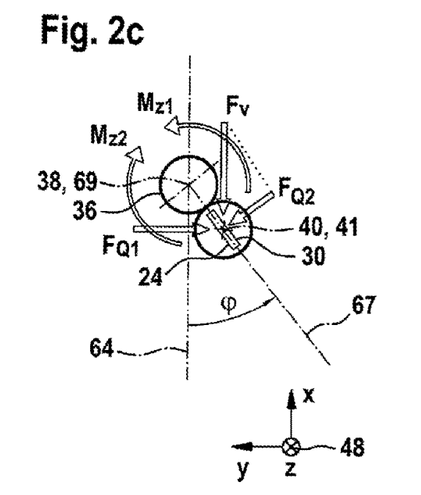

FIG. 2c likewise shows the section A-A through the stroke rod 36 and the saw blade 24 from FIG. 2a in a simplified, schematic top view, but with the saw blade 24 having run untrue. The saw blade 24, as well as the saw-blade receiver axis 40 and the saw-blade longitudinal axis 41, are represented as having been rotated about the stroke axis 38. In a manner similar to FIG. 2b, the stroke axis 38 intersects the direction of advance axis 64 orthogonally at the point of intersection 69, but the broadside axis 67 is not disposed parallel to the direction of advance axis 64, but intersects the latter at an acute angle φ at the point of intersection 69.

In addition, forces, moments and angles of rotation are represented schematically. A vector $F_{Q,1}$ symbolizes the untruing force resulting from the untrue running of the saw blade 24 disposed rearward of the stroke axis 38. This untruing force acts, via the saw blade 24, upon the saw-blade receiver 34. Since the point of application of the untruing force on the saw-blade receiver 34 is set back in the direction of advance 26, a moment $M_{Z,1}$ on the saw-blade receiver 34, about the about the stroke axis 38, is introduced, and the saw-blade receiver is rotated accordingly. This therefore results in a rotation of the saw blade 24, which is fixedly clamped in the saw-blade receiver 34, causing two types of corrective motion. On the one hand, owing to the advance of the hand-guided jigsaw 10 in the direction of advance 26, an advance-motion force $F_V$ acting in an opposite direction of advance 26 acts upon the saw blade 24, in particular on at least one of the broadsides 30 of the saw blade 24 that are oriented obliquely in relation to the direction of advance 26, which force, owing to the rotated saw blade 24, results in a counter-force $F_{Q,2}$ that is opposite to the untruing force $F_{Q,1}$, and thereby introduces a counter-moment $M_{z,2}$ about the stroke axis 38, in the saw-blade receiver 34. On the other hand, owing to the orientation of the saw blade 24 having been rotated, by the angle φ, about the stroke axis 38, in combination with the advance in the direction of advance 26 of the jigsaw, a type of steering direction correction acts upon the saw blade 24. As work on the workpiece progresses in the direction of advance 26, the two corrective motions give rise to a kind of alignment correction, which guides the saw blade 24, or the saw-blade receiver 34 accommodating the saw blade 24, into its initial position, the broadside axis 67 coming into coincidence with the direction of advance axis 64. As a result of the saw blade being disposed rearward of the stroke axis 38, and being disposed in an at least substantially rotationally fixed manner in the saw-blade receiver 34, the directional correction is effected quasi-"automatically", toward the non-untrue reference or initial position.

The method according to the disclosure for correction of untrue running is to be explained in greater detail in the following with reference to FIGS. 2b, 2c. Starting from the initial position according to FIG. 2b, the saw blade 24 is subjected, as in FIG. 2c, to an untruing force $F_{Q,1}$ that results in the saw blade 24 running out of true in a negative y-axis direction, according to the coordinate system 48. Since the saw blade 24 is disposed rearward of the stroke axis 38, the untruing force $F_{Q,1}$ results, at least, in a counter-clockwise rotation of the saw-blade receiver 34 about the z-axis. The saw blade 24, together with the saw-blade receiver 34, rotates by the angle φ about the stroke axis 38. Owing to the continued existence of the advance in a positive x-axis direction, or in the direction of advance 26 of the jigsaw 10, the negative advance-motion force $F_V$ acts, against the direction of advance 26, upon the broadside 30 of the saw blade 24 that is oriented obliquely, by the angle φ, in relation to the direction of advance axis 64, which generates a counter-force $F_{Q,2}$ contrary to the untruing force $F_{Q,1}$ and rotates the saw blade 24, with a moment $M_{Z,2}$, in the clockwise direction about the z-axis, and thereby compensates the untruing of the saw blade. Furthermore, owing to the orientation of the saw blade 24, or of the broadside axis 67 in relation to the direction of advance axis 64, the axes 64, 67 intersecting at the point of intersection 69, an "automatic" directional correction is effected, which moves the saw blade 24, and the saw-blade receiver 34 connected thereto, back into the initial position. Consequently, an autonomous directional correction occurs as a result of the mechanical arrangement of the set-back saw-blade receiver 34, which is accommodated so as to be rotatable about the stroke axis 38.

Figure 3:
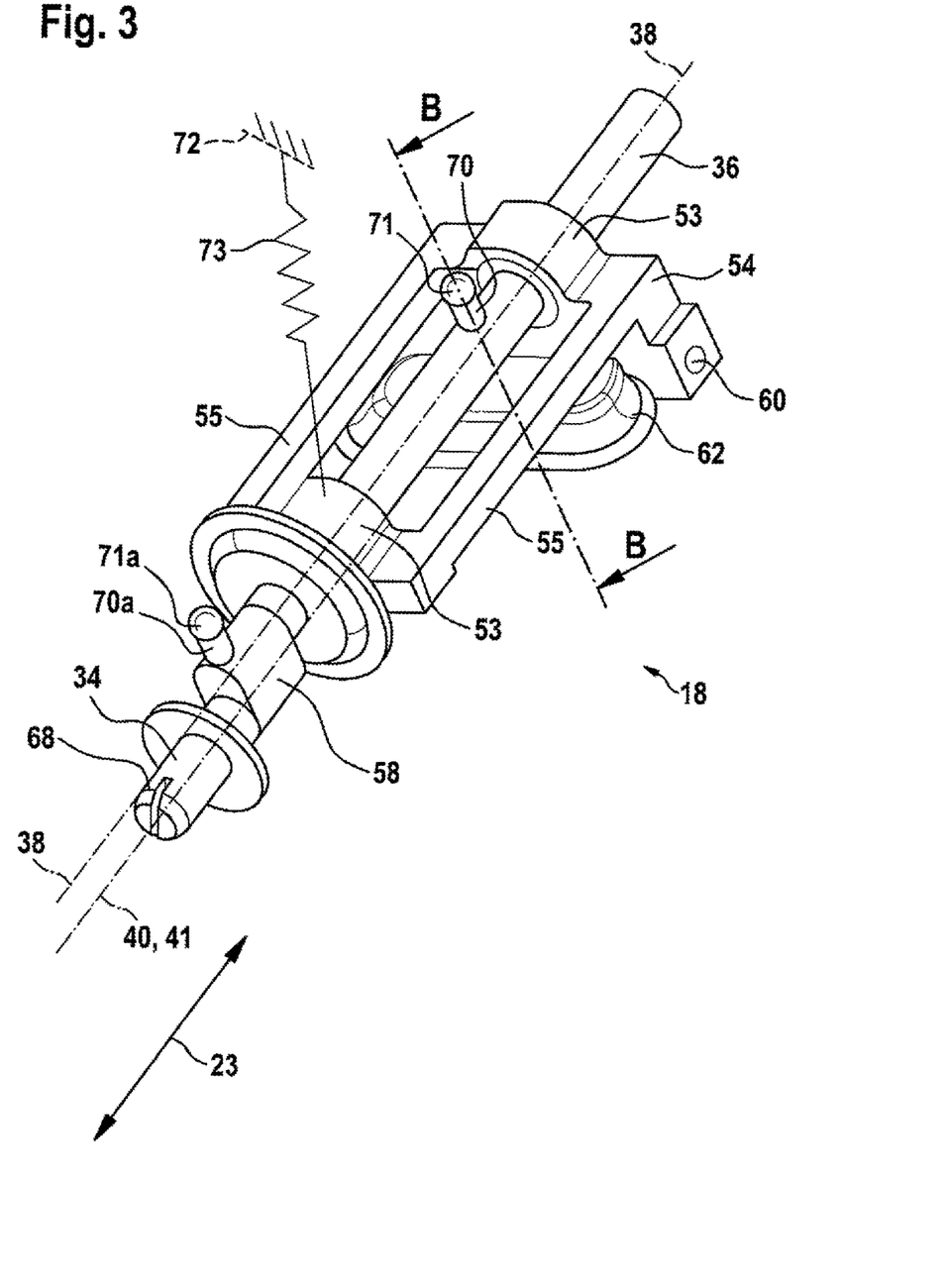

FIG. 3 shows an alternative embodiment of the stroke mechanism 18. In a manner similar to FIG. 2, the stroke mechanism 18 has a stroke rod 36, having a stroke axis 38 extending substantially centrally through the stroke rod 36, the saw-blade receiver 34 being realized integrally with the offset means 58 at the lower end of the stroke rod 36. Arranged in the saw-blade receiver 34 there is a slot-type recess 68, matched to the thickness of the saw blade, for receiving a saw blade 24, not represented. The saw-blade receiver axis 40, which is at least substantially parallel to the stroke axis 38, extends at least substantially centrally through the saw-blade receiver 34. As viewed in the direction of advance 26, the saw-blade receiver 34 is set back from the stroke axis 38. The stroke rod 36 is guided radially and axially by a stroke-rod receiver 54. Unlike the previous figures, there is additionally a first constraint means 70 disposed on the stroke rod 36. The first constraint means 70 is realized so as to be rotationally solid with the stroke rod 36. As an alternative and/or in addition to the first constraint means 70, there may be at least one alternative and/or additional first constraint means 70a disposed on the stroke rod 36 and/or on the offset means 58 and/or on the saw-blade receiver 34. The functioning of the one or more first constraint means 70 is explained in FIGS. 4a to c and the associated description of the drawings.

FIG. 3 additionally shows a third constraint means 72, which is realized, exemplarily, as a spring 63 and which acts on the stroke-rod receiver 54 and on the housing 14, not represented, of the stroke-type saw. The third constraint means 72 may also be a damping element, a joint or the like. It can ensure, for example, that the stroke-rod receiver 54, or the stroke rod 36, and consequently the saw-blade receiver 34, is displaceable in dependence on force, in dependence on a negative advance-motion force $F_V$, not represented here, acting on the jigsaw 10, or on the saw blade 24.

Figure 4A:
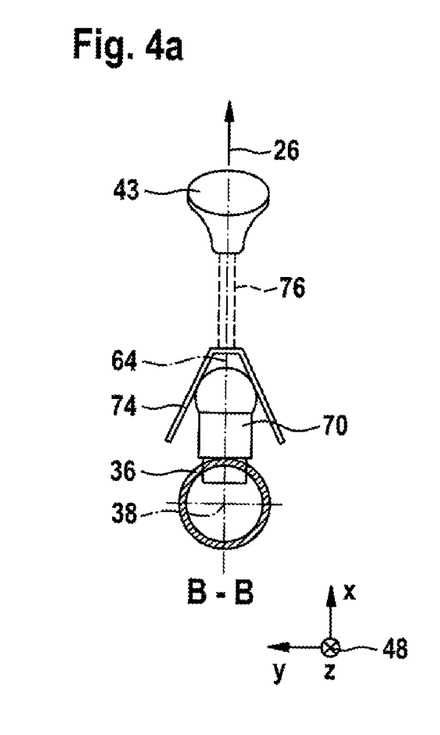
Figure 4B:
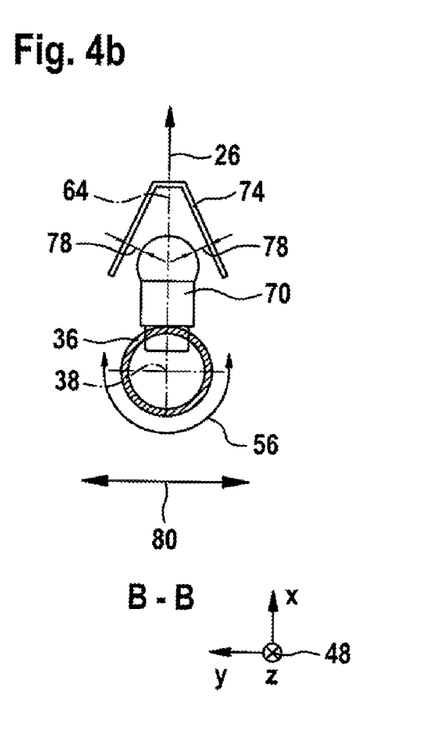
Figure 4C:
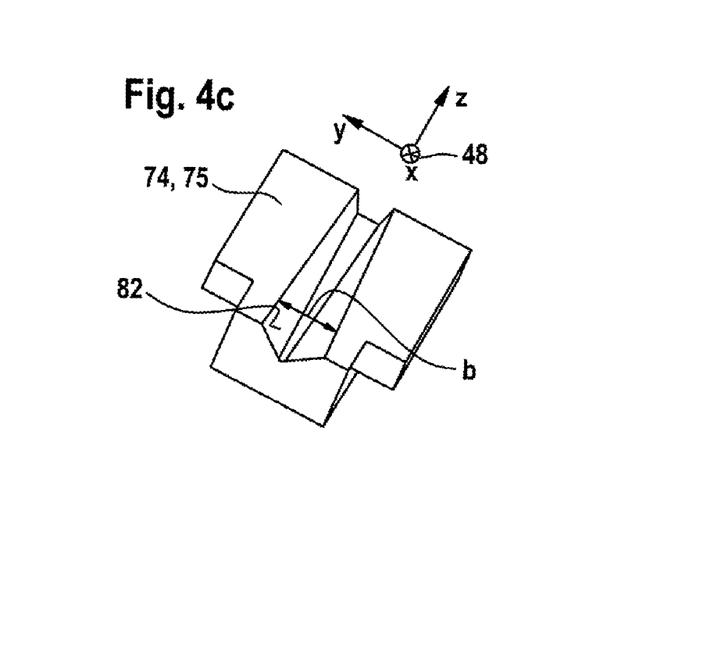

FIGS. 4a and 4b illustrate the functioning of the at least first, further and optionally third constraint means 70, 72, 74 delimiting a rotation capability of the stroke rod 36 and/or of the stroke-rod receiver 54 and/or of the saw-blade receiver 34. The first constraint means 70, realized as a projection having a ball head 71, or as a joint, is connected to the stroke rod 36 so as to be rotationally fixed about the stroke axis 38. Via the ball head 71, it has bearing contact in the further constraint means 74, which in this case is not displaceable in the housing 14 of the jigsaw 10, at least transversely in relation to the direction of advance 26 of the jigsaw 10. As shown by FIG. 4c, the further constraint means 74 may be realized, for example, as a grooved block 75. In addition, optionally fastened to the further constraint means 74, which, according to FIGS. 4a and 4b, is realized as a V-shaped groove, there is a setting means 76, which is realized as a knob and which, for example, enables the further constraint means 74 to be displaced axially in a settable manner, relative to the housing 14, in the direction of the stroke axis 38 (concerning this cf. FIG. 3). As long as the first constraint means 70 according to FIG. 4a bears against the further constraint means 74 without play, a rotation of the stroke rod 36 about the stroke axis 38 is not possible, particularly since in this case the stroke mechanism 18 is also realized such that it is not displaceable transversely in relation to the direction of advance 26. The combined action of the first and the further constraint means 70, 74 thus prevents correction of untrue running. This can be advantageous in certain applications, for example in the case of precise working of thin wooden boards, metal sheets or, in particular, if slow advance speeds of the jigsaw 10 are used.

FIG. 4b shows a section B-B through the stroke rod 36 and the first constraint means 70 according to FIG. 3, and through the further constraint means 74, in a simplified representation. The first and the further constraint means 70, 74 are disposed with play in relation to each other. In a manner similar to FIG. 4a, the first constraint means 70 is connected to the stroke rod 36 so as to be rotationally fixed about the stroke axis 38. The stroke rod 36 and the first constraint means 70 connected thereto are realized so as to be rotatable about the stroke axis 38 in the direction of rotation 56 and/or displaceable in the displacement direction 80. The rotation capability or displacement capability of the stroke rod 36 or of the first constraint means 70 connected to the stroke rod 36 is delimited after overcoming an optional play 78 of the further constraint means 74. The further constraint means 74 may be realized, for example, as a grooved block 75, having a groove width b that varies along the stroke axis 38, as in FIG. 4c, and/or having a settable groove width b. The variable groove width b, which results in a varying play 78 over the stroke travel of the stroke rod 36 in the axial direction of the stroke axis 38, allows preferably an angle of rotation φ, or a rotational play in the direction of rotation 56, to be specified, in particular in a settable manner. Moreover, a rotation capability of the saw-blade receiver 34 and/or stroke rod 36 and/or stroke-rod receiver 54 that is dependent on advance-motion force can be ensured by the third constraint means 72, not represented in FIG. 4b, which is disposed, for example, on the saw-blade receiver 34, the stroke rod 36 or the stroke-rod receiver 54 and which, for example, enables or limits the play 78 of the stroke rod 36 in and/or contrary to the direction of advance 26. For this purpose, the third constraint means 72 could be realized, for example, as a spring 73 that acts on the stroke rod 36, in the direction of advance 26, with a biasing force toward the housing 14 of the jigsaw 10. The spring 73 serves to constrain the stroke rod 36, in such a manner that, in the case of operation with low advance-motion forces, the first constraint means 70 thereof bears without play on the further constraint means 74 according to FIG. 1, and, in the case of operation of the jigsaw 10 with higher advance-motion forces, an increasing rotational play, according to FIG. 4b, is allowed as a result of the stroke rod 36 being swiveled or displaced contrary to the direction of advance 26. As a result, in the case of higher advance speeds, or higher negative advance-motion forces $F_V$, a greater rotation capability of the saw-blade receiver 34 can be effected, and consequently the correction of untrue running can be at least more pronounced. This is advantageous, for example, if, as a result of sawing at a high advance speed, the tendency to run untrue is more pronounced than in the case of sawing at a low advance speed. Moreover, an autonomous, adequate correction of untrue running can thereby be achieved in the case of fine or coarse cutting, without further setting measures.

Shown exemplarily in FIG. 4c is the further constraint means 74, realized as a grooved block 75. The grooved block 75 has a V-shaped groove 82 that is realized with a taper in a positive z-axis direction, according to the coordinate system 48. The further constraint means 74 may optionally have a setting lever 76, as represented in FIG. 4a, or be solidly fixed in the stroke-type saw. Moreover, a stroke-dependent play, as in FIG. 4b, can be realized as a result of the V-shaped groove 82 tapering in the positive z-axis direction. In the top dead center of the stroke motion of the stroke rod 36 in the positive z-axis direction, the play 78 is limited, or impeded entirely, for the unvarying geometry of the first constraint means 70, and consequently a displacement 80 or rotation 56 of the saw-blade receiver 34 and/or of the stroke rod 36 is precluded, whereas, in the bottom dead center of the stroke motion, in which the stroke rod 36 is displaced in the negative z-axis direction, a greater play 78 is possible, owing to the widening V-shaped groove 82 in this region. It can thereby be ensured, advantageously, that, upon entering the workpiece, not represented, on which work is to be performed, the saw blade 24 connected to the stroke rod 36 is guided with as little rotational play and/or displacement play as possible and, in the bottom dead point of the stroke motion, at which untrue running of the saw blade 24 is typically most pronounced, the greatest play 78 to correct the untrue running is achieved. In addition, it is to be noted that the first constraint means 70 may be fixedly connected to the stroke rod 36 and/or to the stroke-rod receiver 54 and/or to the saw-blade receiver 34 and/or to the offset means 58. The first constraint means 70, in combination with the further constraint means 74, is intended to delimit, optionally in a settable manner, merely a capability of the saw-blade receiver 34 to rotate about the stroke axis 38 and/or a capability to be displaced transversely in relation to the direction of advance 26.

Figure 5A:
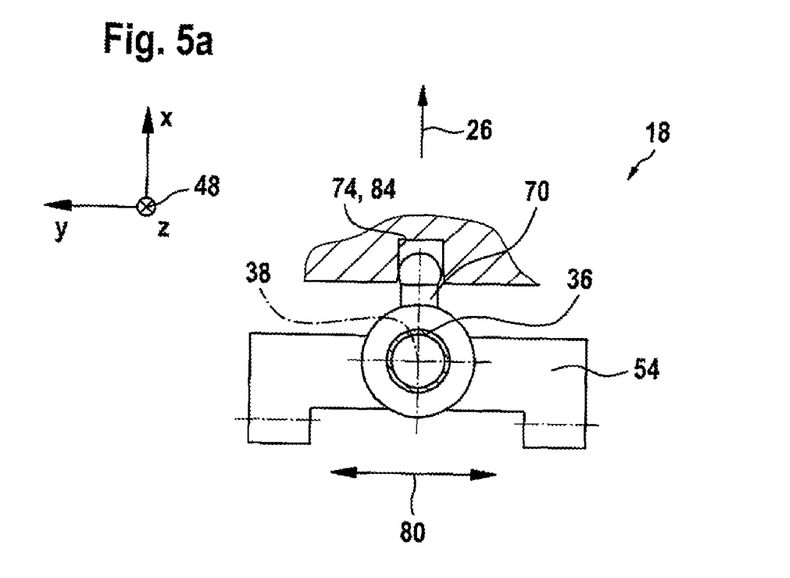
Figure 5B:
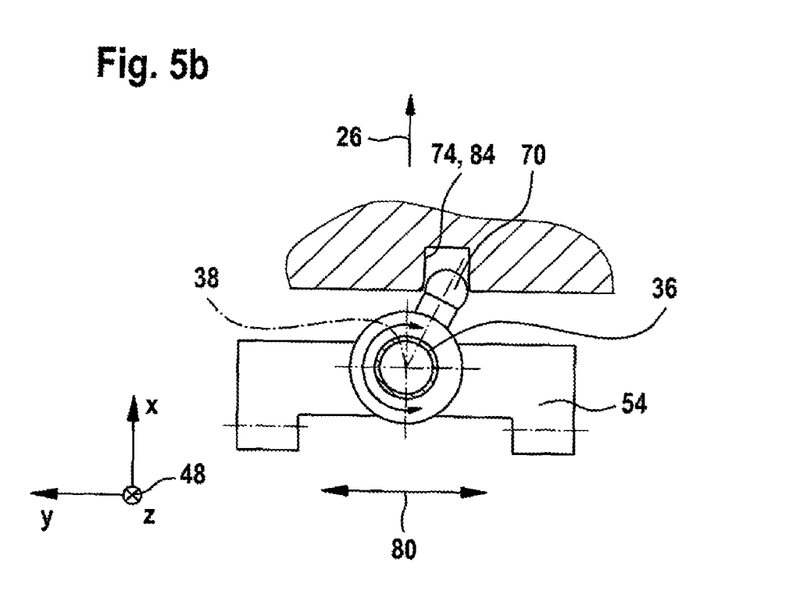

FIG. 5a shows a further optional embodiment of the stroke mechanism 18, having a first constraint means 70, fixed to the stroke rod 36, and a receiver 84 realized as a further constraint means 74. The stroke-rod receiver 54, which guides the stroke rod 36 axially and radially, is disposed so as to be displaceable in a displacement direction 80, transversely in relation to the direction of advance 26. In addition, the stroke rod 36 is realized so as to be rotatable about the stroke axis 38, within the stroke-rod receiver 54. Insofar as the stroke-rod receiver 54 and/or the stroke rod 36 are/is realized so as to be displaceable transversely in relation to the direction of advance 26, untrue running of the saw blade 24 clamped in the saw-blade receiver 34 causes the stroke-rod receiver 54 and/or the stroke rod 36 to be displaced transversely in relation to the direction of advance 26, in this case, exemplarily, in the positive y-axis direction according to the coordinate system 48, owing to the untruing force $F_{Q,1}$ represented in FIG. 2c. Via the first constraint means 70, which is accommodated in a rotatable, but non-displaceable, manner in the further constraint means 74, the transverse displacement of the stroke-rod receiver 54 and/or stroke rod 36 results in the rotation of the stroke rod 36. As already explained, the rotation of the stroke rod 36 counteracts the untruing and brings the saw blade 24 back into its initial position.

It is additionally to be noted that, for the functioning of the disclosure in the case of the saw-blade receiver 34, or at least the saw blade 24, being disposed rearward of the stroke axis 38, the offset means 58 may also be realized so as to be transversely elastic in relation to the direction of advance 26, and consequently nevertheless disposed so as to be rotatable about the stroke axis 38. Such an untrue-running correction device advantageously enables cost savings to be made, for example for an elaborate rotary support of the stroke rod 36.

What is claimed is:

1. A hand-guided stroke-type saw, comprising:
   a stroke rod that defines a stroke axis extending axially through the stroke rod; and
   a saw-blade receiver that is configured to receive a saw blade, that defines a saw-blade receiver axis extending axially through the saw-blade receiver, and that is supported by the stroke rod such that the saw-blade receiver axis is substantially parallel to the stroke axis and such that the saw-blade receiver axis is offset radially from the stroke axis in a first direction opposite to a direction of advance; and
   a first constraint member and at least one further constraint member configured to convert a displacement motion of at least one of (i) the saw-blade receiver, (ii) the stroke rod, and (iii) a stroke-rod guide into a rotary motion of the at least one of (i) the saw-blade receiver, (ii) the stroke rod and (iii) the stroke-rod guide;
   wherein:
      the displacement motion is in a direction perpendicular to the saw-blade receiver axis and the direction of advance that moves a saw blade received in the saw-blade receiver out from an initial position; and
      the rotary motion is configured to counteract the displacement motion and return the saw blade back to the initial position.

2. The hand-guided stroke-type saw according to claim 1, wherein the saw-blade receiver is rotatable about the stroke axis.

3. The hand-guided stroke-type saw according to claim 1, wherein the saw-blade receiver is configured to adjust a first distance by which the saw-blade receiver axis is radially offset from the stroke axis.

4. The hand-guided stroke-type saw according to claim 1, wherein at least one of (i) the saw-blade receiver, (ii) the stroke rod, and (iii) a stroke-rod receiver is configured to be movable or swivelable in at least one of a rotation and a displacement along at least one of (i) a transverse direction with respect to the stroke axis and (ii) the direction of advance.

5. The hand-guided stroke-type saw according to claim 4, wherein the first constraint member and the at least one further constraint member are further configured to delimit at least one of a rotational play of the rotation and a displacement travel of the displacement of (i) the saw-blade receiver, (ii) the stroke rod, or (iii) the stroke-rod receiver.

6. The hand-guided stroke-type saw according to claim 5, further comprising:
   a third constraint member configured to delimit the at least one of the rotational play and the displacement travel of (i) the saw-blade receiver, (ii) the stroke rod, or (iii) the stroke-rod receiver.

7. The hand-guided stroke-type saw according to claim 5, further comprising a housing, wherein:
   the first constraint member defines a constraint-member receiver that is affixed to the housing, and that is rotatably connected to one of (i) the saw-blade receiver, (ii) the stroke rod and (iii) the stroke-rod receiver; and
   the at least one further constraint member is received in the constraint-member receiver so as to be at least partially movable.

8. A method for correcting an untrue running of a saw blade received in a stroke-type saw in operation with a workpiece, comprising:
   advancing a saw-blade along a direction of advance for a workpiece,
      the saw-blade receiver rotatably mounted to at least one stroke rod so as to be rotatable about a stroke axis of the at least one stroke rod,
      the saw-blade received in a saw-blade receiver in a rotatably fixed manner such that a saw-blade receiver axis of the saw-blade receiver is radially offset from the stroke axis along a direction opposite the direction of advance and is parallel to the stroke axis; and
   in response to a displacement motion of at least one of (i) the saw blade receiver, (ii) the stroke rod, and (iii) a stroke rod guide due to an untrue running of the saw blade along the direction of advance, engaging a first constraint member and at least one further constraint member to convert the displacement motion into a rotary motion of the at least one of (i) the saw-blade receiver, (ii) the stroke rod and (iii) the stroke-rod guide;
   wherein:
      the displacement motion is in a direction perpendicular to the saw-blade receiver axis and the direction of advance so as to move the saw blade out from an initial position; and
      the rotary motion returns the saw blade to an initial position relative to the at least one stroke rod to counteract the untrue running.

9. The method according to claim 8, wherein:
   advancing the saw blade along the direction of advance with an untrue running causes the saw blade to be aligned transversely relative to the direction of advance; and
   the transverse alignment of the saw blade causes at least one of a reversal of the rotation of the saw-blade receiver and a counter transverse force acting on a lateral face of the saw blade that counteracts the untrue running and returns the saw blade to the initial position relative to the at least one stroke rod.

10. A hand-guided stroke-type saw, comprising:
   a stroke rod that defines a stroke axis extending axially through the stroke rod; and
   a saw-blade receiver that is configured to receive a saw blade, that defines a saw-blade receiver axis extending axially through the saw-blade receiver, and that is supported by the stroke rod such that the saw-blade receiver axis is substantially parallel to the stroke axis and such that the saw-blade receiver axis is offset radially from the stroke axis in a first direction opposite to a direction of advance;
   wherein, when the saw blade is received in the saw blade receiver, the saw-blade receiver is operable to adjust a first distance by which the saw-blade receiver axis is radially offset from the stroke axis.

11. The hand-guided stroke-type saw according to claim 10, wherein the saw-blade receiver is rotatable about the stroke axis.

12. The hand-guided stroke-type saw according to claim 10, wherein at least one of (i) the saw-blade receiver, (ii) the stroke rod, and (iii) a stroke-rod receiver is configured to be movable or swivelable in at least one of a rotation and a displacement along at least one of (i) a transverse direction with respect to the stroke axis and (ii) the direction of advance.

13. The hand-guided stroke-type saw according to claim 12, further comprising:
   a first constraint member and at least one further constraint member configured to delimit at least one of a rotational play of the rotation and a displacement travel of the displacement of (i) the saw-blade receiver, (ii) the stroke rod, or (iii) the stroke-rod receiver.

14. The hand-guided stroke-type saw according to claim 13, further comprising:
   a third constraint member configured to delimit the at least one of the rotational play and the displacement travel of (i) the saw-blade receiver, (ii) the stroke rod, or (iii) the stroke-rod receiver.

15. The hand-guided stroke-type saw according to claim 13, further comprising a housing, wherein:
   the first constraint member defines a constraint-member receiver that is affixed to the housing, and that is rotatably connected to one of (i) the saw-blade receiver, (ii) the stroke rod and (iii) the stroke-rod receiver; and
   the at least one further constraint member is received in the constraint-member receiver so as to be at least partially movable.

16. A hand-guided stroke-type saw, comprising:
   a stroke rod that defines a stroke axis extending axially through the stroke rod;
   a saw-blade receiver that is configured to receive a saw blade, that defines a saw-blade receiver axis extending axially through the saw-blade receiver, and that is supported by the stroke rod such that the saw-blade receiver axis is substantially parallel to the stroke axis and such that the saw-blade receiver axis is offset radially from the stroke axis in a first direction opposite to a direction of advance, wherein at least one of (i) the saw-blade receiver, (ii) the stroke rod, and (iii) a stroke-rod receiver is configured to be movable or swivelable in at least one of a rotation and a displacement along at least one of (i) a transverse direction with respect to the stroke axis and (ii) the direction of advance; and
   a first constraint member and at least one further constraint member configured to delimit at least one of a rotational play of the rotation and a displacement travel of the displacement of (i) the saw-blade receiver, (ii) the stroke rod, or (iii) the stroke-rod receiver such that the (i) the saw-blade receiver, (ii) the stroke rod, or (iii) the stroke-rod receiver is free to at least one of rotate and travel over the extent of the at least one of rotational play and displacement travel.

17. The hand-guided stroke-type saw according to claim 16, wherein the saw-blade receiver is operable to adjust a first distance by which the saw-blade receiver axis is radially offset from the stroke axis.

18. The hand-guided stroke-type saw according to claim 16, further comprising:
   a third constraint member configured to delimit the at least one of the rotational play and the displacement travel of (i) the saw-blade receiver, (ii) the stroke rod, or (iii) the stroke-rod receiver.

19. The hand-guided stroke-type saw according to claim 16, further comprising a housing, wherein:
   the first constraint member defines a constraint-member receiver that is affixed to the housing, and that is rotatably connected to one of (i) the saw-blade receiver, (ii) the stroke rod and (iii) the stroke-rod receiver; and
   the at least one further constraint member is received in the constraint-member receiver so as to be at least partially movable.

* * * * *